З,307,967
RUBBER REINFORCING ARTICLES
Byron M. Vanderbilt and Robert E. Clayton, Westfield, N.J., assignors to Esso Research and Engineering Company, a corporation of Delaware
No Drawing. Filed Sept. 3, 1965, Ser. No. 485,107
24 Claims. (Cl. 117—77)

This application is a continuation-in-part of Serial No. 391,850, filed August 25, 1964, which in turn is a continuation-in-part of Serial No. 138,420, filed September 15, 1961 and now abandoned, which in turn is a continuation-in-part application of Serial No. 30,089, filed May 19, 1960, now forfeited.

This invention relates to a method for preparing an article suitable for the reinforcement of polymers. More particularly, the invention is concerned with the preparation of a reinforcing agent containing an initial coating of an organosilane compound and a top coating of a free radical curing agent and a free radical curable elastomer; this invention is also concerned with the use of this article in the reinforcement of rubbers with the aid of curing systems conventionally used in the bonding of the same or dissimilar rubbers to each other.

In the past, a polyolefinic rubber hydrocarbon has been chemically reacted with a polychloromonohydrosilane and the reaction product therefrom has been employed as film forming material to provide strongly adherent coatings to glass and ceramics; such a procedure is described in U.S. Patent No. 2,475,122. Likewise, it is known to react a polyolefinic rubber, hydrocarbon with a trichlorosilane or methyl dichlorosilane at elevated temperatures and pressures and subsequently apply the resulting product to a surface which is to be bonded to a rubber, as per U.S. Patent No. 2,567,778. It should be noted, however, that these are rubber derivatives of simple silanes and are not silanes containing an olefinic group or other active group which can be bonded in one step directly to the rubber to provide a rubber to glass bond therefrom.

It has now been discovered that natural or synthetic rubbers can be effectively reinforced with a reinforcing agent whose surface contains an initial coating of an organosilane compound and a top coating of an elastomer containing a free radical curing agent. The resultant elastomer coated reinforcing agent when cured in contact with a natural or synthetic rubber affords a product having a much higher bursting and tensile strength than is possible by curing the natural or synthetic rubber in contact with a reinforcing agent containing no elastomer top coating.

Thus in accordance with the broad aspect of this invention, an organosilane compound, e.g., an unsaturated silane or any of its various forms, is applied to the surface of reinforcing agent. The pretreated reinforcing agent is then coated with a free radical curable elastomer containing a free radical curing agent and dried to remove substantially all of any diluent or solvent which may have been used to apply the organosilane or elastomer. The dried elastomer coated reinforcing agent is non-tacky in nature, very flexible and possesses an extremely high tensile strength. The dried elastomer coated reinforcing agent may be used immediately or it may be stored over long periods of time, e.g., from one day to several months, until it is desired to use it in the reinforcement of natural or synthetic rubbers; no significant loss of the aforesaid physical properties is noted after prolonged periods of storage.

In accordance with this invention, the reinforcing agent is first provided with an organosilane finish. The reinforcing agent may be inorganic or organic in nature and may be any of those commonly employed in the reinforcement of rubbery or thermoplastic or thermosetting polymers or copolymers. Suitable for use are metallic materials such as for example, steel, iron, copper, nickel, nichrome, etc.; organic materials such as cotton, rayon, nylon, hair, vegetable fibers, "Orlon," "Dacron," etc.; siliceous materials such as glass, clays, silicas, diatomaceous earth, porcelains, quartz, etc. All of the aforesaid materials may be employed in the form of sheets, fibers, yarns, rovings, wires, powders of various particle sizes, staple yarns, woven fabrics, woven rovings, cord and chopped rovings. The preferred reinforcing agents are the siliceous materials and this invention is particularly applicable to the adhesion of a rubber to fiber glass in any of the forms set forth above.

The organosilane compounds employed in the present invention are unsaturated silanes or siloxane forms of the unsaturated silanes or mixtures of one or more unsaturated silanes with one or more of their siloxanes. The unsaturated silane may be represented by the formula

wherein $R_1$ is a radical containing vinyl type unsaturation selected from the group consisting of alkenyl, styryl, alkenoylalkyl, and alkenoyloxyalkyl; X is selected from the group consisting of halogen, hydroxyl, alkoxy, acyloxy; $R_2$ and $R_3$ are independently selected from the group consisting of hydroxyl, methyl, halogen, alkoxy, acryloxy and $R_1$. Specific compounds which may be employed are the following: vinyl tri(beta-methoxyethoxy)-silane, vinyl triethoxy silane, divinyl diethoxy silane, vinyl trichlorsilane, divinyl dichlorsilane, vinyl trimethoxy silane, vinyl diethoxy chlorsilane, vinyl triacetoxy silane, allyl tri(beta-methoxyethoxy)silane, allyl triethoxy silane, diallyl diethoxy silane, allyl trichlorsilane, diallyl dichlorsilane, allyl trimethoxy silane, allyl diethoxy chlorsilane, allyl triacetoxy silane; the substitution of the above designated chlorine atoms with bromine atoms, and in place of the vinyl and allyl groups of the named compounds, the corresponding propenyl, styryl, methallyl, acryloalkyl, methacryloalkyl, acryloxy propyl and methacryloxy propyl compounds as above set forth. Other specific compounds that are excellent treating agents for siliceous surfaces employed in effecting good adhesion between such surfaces and unsaturated rubbers are: gamma-methacryloxy propyl trimethoxy silane, gamma-acryloxypropyl triethoxy silane, gamma-methacryloxypropyl dimethyl chlorsilane, gamma-(beta-methacryloxyethoxy) propyl trimethoxy silane, and gamma-methacryloxy propyl methyl diacetoxy silane. All of these specific silanes are convertible into and useable corresponding silanols by hydrolysis or only partial hydrolysis with water. Also, the silanol condensation products, i.e., the siloxanes, are likewise equally useable for treating the siliceous surfaces. The unsaturated silane as its acid chloride is effectively applied to the glass surface as a solution in a hydrocarbon solvent such as hexane or heptane. Glass fibers may be treated with the resulting solution for 5 to 60 minutes, preferably at temperatures up to 200° F. followed by washing with some of the hydrocarbon solvent, and then with a polar solvent such as an alcohol or water. The organosilane-treated reinforcing agent, with or without subsequent washing may be immediately used as is or is preferably dried to remove substantially all of the diluent or solvent employed in the organosilane treating composition; air drying at room temperature for about 10 minutes to 24 hours or oven drying at a temperature below about 300° F. for a few seconds up to about 12 hours will usually suffice to evaporate off any diluent or solvent.

After drying a finish equivalent to about 10 to about 40 molecules thick of the organosilane may be obtained.

The organosilane compound may be applied as a liquid composition, i.e. an aqueous solution or emulsion or anhydrous organic solvent solution or emulsion containing the organosilane (conventional binders, sizing agents and/or lubricants may also be present in the liquid composition). In the aqueous solution, the organosilane since it is hydrolyzable, is present either as a silanol or as a siloxane (the polymerized form of the silane) or as a mixture of both. In the aqueous emulsion, if sufficient water is present, the same forms of the silane hydrolysis products are present. However, the silane can be used in organic and anhydrous solvents in which case the silane is present as such or it may be pretreated with less than stoichiometric amounts of water thus, to only partially hydrolyze the ester groups so that only one or two hydroxyl groups are attached to the silicon atom per molecule. At any event, the concentration of the silane in aqueous solution, emulsion, or anhydrous organic solvent ranges between about 0.2 and about 5.0 wt. percent, preferably between about 0.4 and about 3.0 wt. percent. This results in a deposit of silane, based on the reinforcing agent weight, of between about 0.1 and about 3.0 wt. percent, preferably between about 0.5 and about 2.0 wt. percent. The silane is preferably applied to glass monofilaments as spun or drawn, or to bundles, strands, ends, cord, or even to glass fabric. The glass surface must be free of conventional size and/or lubricant and if necessary it is heat cleaned to remove such substances, before application of the silane, by heating it up to 600–1500° F. for about 10 minutes to a few seconds. It may also be desirable to incorporate about 0.25 to about 5.0 weight percent of the free radical curable elastomer in the liquid composition containing the organosilane in order to add "body" to the composition.

Treatment of the reinforcing agent with the liquid composition containing the organosilane may be accomplished by any convenient method, e.g. spraying, dipping, brushing, etc. for about 5 seconds to about 60 minutes at temperatures up to about 200° F.

In the second step for preparing the reinforcing agent, the silane-treated reinforcing agent is subsequently treated with a liquid composition containing 5 to 70 wt. percent, preferably 15 to 55 wt. percent of an elastomer capable of being cured with a free radical catalyst. The liquid composition may be in the form of an aqueous emulsion, organic solvent solution, a plastisol, an organosol, a dispersion or a cement or latex. The liquid composition also contains 0.2 to 10 parts, preferably 0.5 to 5 parts, per 100 parts of the elastomer, of a free radical curing agent.

After treatment of the silane-treated reinforcing agent with the liquid composition containing the elastomer and curing agent, the resultant product is then dried to remove substantially all of any diluent or solvent used in applying the silane and elastomer-curing agent. Drying may take place in air at room temperature over a period of several minutes to 24 hours or more, alternatively the coated reinforcing agent may be dried at elevated temperatures, e.g. 100° to 1000° F. for a few seconds up to 10 minutes. In general, the drying conditions may vary considerably, depending on the types and amounts of diluent or solvents as well as the thickness of the silane and elastomer coatings. The only caution that must be observed during the drying operation is that when drying at elevated temperatures, the drying time and drying temperature should be such as to evaporate off substantially all of the diluent or solvent but not so extreme as to crosslink or cure the elastomer, i.e. the free radical curing agent-containing elastomer must remain in a curable state.

After drying, a reinforcing agent having a very thin non-tacky top coating of the free radical curable elastomer and the free radical curing agent is obtained. This top coating may vary in thickness from about twice to about ⅒th or less of the thickness or diameter of the reinforcing agent. Generally the elastomer top coating will comprise about 10 to 60 wt. percent, preferably 15 to 45 wt. percent of the total weight of the dried elastomer coated reinforcing agent. The elastomer coating will also contain 0.2 to 10 parts, preferably 0.5 to 5 parts per 100 parts of the elastomer, of a free radical curing agent.

As mentioned above, the elastomer which forms the top coating on the reinforcing agent must be one which is capable of being cured with a free radical curing agent. These elastomers include natural rubber, ethylene-alpha olefin copolymers and terpolymers, synthetic polyisoprenes, the copolymer of butadiene with styrene (SBR), the copolymer of butadiene with acrylonitrile (NBR), chlorinated butyl rubber, brominated butyl rubber, polybutadiene, polychloroprene (neoprene) and mixtures or two or more elastomers thereof. Butyl rubber is prepared by reacting 70 to 99.5% of a $C_4$–$C_7$ isomonoolefin, i.e., isobutylene with from 30 to 0.5% of a $C_4$–$C_{10}$ conjugated diolefin, e.g., isoprene, butadiene, piperylene, in accordance with the well known process described in U.S. Patent 2,356,128, which patent is incorporated herein by reference. The chloro or bromo butyl rubber containing at least 0.5 wt. percent of halogen in the rubbery polymer but not more than about 1 atom of chlorine per double bond in the rubber or not more than 3 atoms of combined bromine per double bond in the butyl rubber are described in detail as to properties and methods of preparation in U.S. Patent 2,944,578 which is incorporated herein by reference. The rubbery copolymer of butadiene with styrene may be prepared in accordance with the process described in U.S. Patent No. 1,938,730 which is incorporated herein by reference. The rubbery copolymer of butadiene with acrylonitrile may be prepared by the process described in U.S. Patent 1,973,000 which is also incorporated herein by reference.

The free radical curing agent is one which produces free radical groups during the temperature and pressure conditions commonly employed in the curing of rubbers. Suitable curing agents include diazomethane, alpha-alpha-azo-diisobutyronitrile, as well as the organic peroxides which are preferred herein such as dicumyl peroxide, di-t-butyl peroxide, or 2,5-dimethyl-2, 5-di(tertiary-butyl peroxy) hexane, cumene hydroperoxide, 2,5-dimethyl-2,5-di-(tertiary butyl peroxy) hexyne-3, t-butyl cumyl peroxide; t-butyl perbenzoate; the peroxides obtained by the oxidation of hydrogenated rosin, and di-t-butyl diperphthalate.

If desired, conventional pigments, stabilizers, plasticizers, metal oxides, fillers, antioxidants, carbon blacks, etc. may be incorporated in the liquid composition containing the elastomer and curing agent in amounts ranging from 0.2 to 100 parts or more, per 100 parts of elastomer.

If alkyl silanes containing functional substituents on the alkyl groups such as amino, mercapto, epoxy, carboxyl, cyano and the like, as described in copending commonly assigned application, Serial No. 392,027 (filed August 25, 1964) which disclosure is incorporated herein by reference in its entirety, are used as the organosilane compounds, then the curing agents incorporated within the very thin elastomer top coating on the reinforcing agent may be sulfur, sulfur-containing compounds, vulcanization accelerators, metal oxides, and the like, rather than or in addition to, a free radical curing agent and the elastomer itself need not necessarily be one which is capable of being cured with a free radical curing agent as described in said Serial No. 392,027.

The dried elastomer coated reinforcing agent may then be used for the reinforcement of natural or synthetic rubbers. The natural or synthetic rubbers to be reinforced with varying amounts, e.g. 0.2 to 100 parts or more, per 100 parts of the rubber, of conventional curatives and fillers such as sulfur, sulfur type compounds, accelerators, stabilizers, metal oxides, extender oils, heat reactive resins, plasticizers, antioxidants, clays, quinones, peroxides, carbon blacks, etc. commonly employed in the rubber industry.

Reinforcement of the desired natural or synthetic rubber takes place by contacting the dried elastomer coated reinforcing agent with the rubber to be reinforced either contiguously or intermingled in conventional vulcanizing equipment and curing the resultant elastomer coated reinforcing agent-rubber composite at a temperature between about 250° and about 400° F., preferably between about 280° and about 330° F. for between about 5 and about 120 minutes, preferably between about 10 and about 45 minutes, and under pressure of between about 5 and about 1,000 p.s.i.g., preferably between about 50 and about 600 p.s.i.g.

The rubber to be reinforced may be any one of those referred to hereinbefore as "an elastomer capable of being cured by a free radical curing agent." However, it should be understood that the rubber to be reinforced need not necessarily be one which is free radical curable nor does the reinforcement process require the use of a free radical curing agent. The rubber to be reinforced may be compounded with conventional amounts of any well known curing agent such as sulfur, sulfur-type compounds, quinones, sulfur accelerators, metal oxides (e.g. ZnO), phenolaldehyde resins, etc., as well as organic peroxides. Once the surfaces of the reinforcing agent have been substantially coated with the free radical curable elastomer, the chemistry which occurs during the reinforcement process is that involved in the bonding of two same or dissimilar rubbers to each other. Without being restricted to any theory, it is believed that during the reinforcement process (which takes place at elevated temperatures) the free radical curing agent serves to cause a tight bond between the organosilane and the reinforcing agent and to copolymerize the organosilane with the elastomer coating. Simultaneously, the conventional curing agent in the rubber to be reinforced causes a tight bond between it and the elastomer top coating on the reinforcing agent. It is recognized by those skilled in the art that the rubber to be reinforced and/or the elastomer which forms the top coating on the reinforcing agent are generally selected on the basis of their known compatibility with each other and the curing system is generally one which has been proven to be effective, for bonding the selected rubber to be reinforced to the selected elastomer top coating on the reinforcing agent.

The unitary rubber-reinforcing article, particularly the elastomer coated fiber glass woven or twisted into a cord are advantageously employed in the preparation of reinforced hoses, belts, tires, etc. For example, tires reinforced with the rubber-reinforcing articles of the present invention are stronger, more durable, more dimensionally stable, more resistant to heat, and more resistant to weathering than are conventional tires. In the past, jet plane tires contain nylon which melts at a temperature of 482° F. Unless the tire wells in the plane are refrigerated, the tires during flight can become heated to a temperature as high as about 450° F. This causes great weakening of the tires and restricts the design of aircraft due to the relatively low softening points of organic fibers contained in the tires. Although refrigeration has been used, this is not entirely satisfactory since it provides excessive ballast and also increases costs. High tire temperatures are also encountered from the friction between the tire and runway surface during take-off and landing operations. The exact temperatures obtained are unknown, but are undoubtedly excessive enough to be a major factor in the high incidence of blow-outs during these operations.

The desirability of replacing nylon tire fabric with glass cord fabric is known since glass has a tensile strength of 200,000 to 250,000 p.s.i. as compared to 89,000 to 108,000 p.s.i. for nylon. Furthermore, glass maintains its full strength up to 600° F. and retains 25% of its strength at 1000° F. It also has good dimensional stability, i.e., it does not continue to grow in length; more than that, glass is not flammable and does not corrode. Steel is not suitable as a substitute for nylon since it is heavy, i.e., having a density of 7.8, and it is relatively inflexible, i.e., having an elongation of only 1 to 2%. In the past, it has been attempted to use glass in lieu of nylon for the manufacture of tires. However, these attempts have been unsuccessful due to the poor adhesion between the glass and the rubber. If, for example, glass cord was used for the carcass ply cord in an automobile tire, a failure would result in 100 to 1,100 miles due to ply separations and self-abrasion of the cord filaments.

In this invention, the elastomer top coating which is applied to the silane treated glass filaments, is adhered strongly to the glass. Therefore, the glass is protected against the self-abrasion of the cord filaments, i.e., the filaments are separated from one another and cannot rub together and break. Similarly, ply separation does not occur in the instant tires since the carcass ply rubber composition is tightly bonded to the glass fabric.

Besides superior jet tires, other tires, e.g., bus and truck tires, and off the road earth moving equipment tires, can be provided herein. It is known that these tires build up considerable heat during high speed or cross country off-road driving. To alleviate this problem thinner tires have been fabricated in which steel wire is employed as the carcass ply cord. However, this is not entirely satisfactory since the steel cord produces a hard riding tire. Tires which continue to stretch during use, e.g., those with nylon ply cords therein, become progressively weaker. This weakening occurs because the cord strength is reduced, and because rubber compositions therein are placed under increasing stress as the tire becomes permanently larger. This increases the incidence of stress cracks in the sidewall rubber and tread rubber and also increases the incidence of weather cracking since stretched rubber compositions are more readily attacked, i.e., cracked by ozone. Glass is dimensionally stable, i.e., the glass tire cords do not "creep" or grow in length; and therefore, the glass cords do not thin down and diminish in strength and the rubber components of the tire are not placed under increasing stress. Furthermore, the tires of this invention are superior since the casing can be more frequently reused, that is, the number of times the casing can be recapped with new tread is increased.

A stronger and more durable racing tire is another example of the applicability of the present invention. Another example is a boat trailer tire which involves an additional factor besides the strength, durability, etc., namely, resistance to water. If the trailer wheels are immersed in water when the boat is launched or returned to the trailer, the water may be in contact with punctures, cuts, and/or abraded spots in the tire fabric. Obviously, a steel tire cord would be inoperative due to rust formation thereon. It should also be noted that water from snow and rain can cause damage to exposed fabric in any prior art tire especially if snow-melting chemicals, which are particularly corrosive to steel tire cord, are found therein. Furthermore, water would be wicked along the ply cord if it were not chemically bonded to the surrounding rubber. This is a particular problem to tire recappers since the water that has wicked into the casing turns into steam during the curing steps which causes a laminate separation or blister.

Further disclosures of the techniques for preparing the elastomer coated reinforcing agent of this invention and for reinforcing various rubbers with the instant elastomer coated reinforcing agents may be found in commonly assigned copending applications, Serial No. 391,850, filed August 25, 1964, Serial No. 420,264, filed December 22, 1964, Serial No. 421,546, filed December 28, 1964 and Serial No. 423,372, filed January 24, 1965 as well as in "The Bonding of Fibrous Glass to Elastomers" by B. M.

Vanderbilt and R. E. Clayton, and "Glass Fiber Reinforced Elastomers" by R. E. Clayton and R. L. Kolek, presented at the American Chemical Society meeting of September 4, 1964 (Chicago, Ill.). All of the aforesaid patent applications and publications are incorporated herein by reference in their entirety.

The following examples are submitted to illustrate the invention. Unless otherwise indicated, all parts and percentages in the specification are based upon weight.

*Example 1*

A solution was prepared comprising 1.25 percent of vinyl trichlorosilane in xylene as the solvent. A glass plate, of the type employed for mounting photographic slides, was immersed in this solution for 30 minutes. Subsequently, the plate was washed with water and air dried for about 60 minutes to provide a product having a very thin silane finish appearing merely as a cloudiness on the glass surface. The glass plate treated was subsequently cured in a platen press under a pressure of 500 p.s.i.g. for 1 hour at 300° F. in contact with a natural rubber layer 0.05 inch in thickness containing 1.5 wt. percent of dicumyl peroxide as the curative. The end products therefrom were subjected to qualitative screening type adhesion tests wherein the rubbery layer broke before failure occurred in the glass-rubber bond.

The aforementioned procedure was repeated with (a) glass plate having no silane present and subsequently contacted and cured with the rubber and with (b) glass plate containing a thin finish of ethyl silane, a saturated silane and subsequently contacted and cured with the rubber. The same rubber and peroxide curing procedure was used in all cases. In the qualitative adhesion tests, a good bond was obtained with the glass plate having the vinyl trichlorsilane (an unsaturated silane) finish thereon. No adhesion was obtained with the glass plate having no silane finish and no adhesion was obtained with the glass plate having the saturated silane finish, thus illustrating the necessity of pretreating the reinforcing agent with an unsaturated silane prior to contact with the rubber.

*Example 2*

Rubbery compounds were prepared as indicated in Table I below. Paracril-C is a nitrile rubber manufactured by Naugatuck Chemical Division of U.S. Rubber Company, and is a copolymer of approximately 65% butadiene with 35% acrylonitrile. The chlorobutyl rubber employed herein is a copolymer of 98% of isobutylene with 2% of isoprene which has 1.2% of chlorine incorporated therein.

Glass fabric (181 satin weave) was coated with various silane compounds as set forth in Table II. The fabric was immersed at ambient temperature in benzene and the finishing agent, used as its acid chloride, was added dropwise up to a total concentration of 2½% by weight based upon benzene. After standing in contact with the benzene solution for 2 hours, the treated fabric was rinsed in succession with benzene, isopropanol and water. In case of A–172 and Volan, they were applied to the glass fabric as recommended in the product information bulletins furnished by the suppliers. The glass fabrics were then dried at ambient temperatures, followed by drying in a vacuum oven at 200° F. for 30 minutes.

The aforementioned fabric was then placed between two layers of rubbery compound, the outer surface of which was backed with cotton canvas to inhibit elongation during the adhesion testing. Mylar film (commercial polyester film) was inserted at one end of the resulting sandwich between one of the rubbery layers and the glass fabric to provide an opening for the start of subsequent strip adhesion testing. This specimen was cured in a press mold at a temperature of 300° F. and a pressure of 520 p.s.i.g. for 20 minutes for the natural rubber and nitrile rubber and for 60 minutes for the chlorobutyl rubber. The cured end product has the following dimensions: 6" x 2" x 5/32". A 1" wide specimen was cut for testing.

The adhesion of the cured products therefrom was determined on an Instron tester at a jaw separation rate of 2" per minute and the results are recorded in Table II.

It is evident from this example that a saturated silane such as ethyl trichlorosilane is inoperative, an inferior bond being provided between the glass and the rubber polymer. Therefore, it is necessary to utilize an unsaturated silane to provide superior adhesion between the rubbery layer and the glass layer. Also it is highly significant that an unsaturated chrome finish, which is more widely used in the reinforced plastic industry than are the unsaturated silane finishes, is not effective for glass adhesion to rubber.

TABLE I.—TEST COMPOUNDS

|  | Natural Rubber | Nitrile Rubber | Chlorobutyl Rubber |
|---|---|---|---|
| Pale Crepe | 100 | | |
| Paracril-C | | 100 | |
| MD-551 | | | 100 |
| SRF Black | 50 | 50 | 50 |
| Stearic Acid | 1 | 1 | 1 |
| Zinc Oxide | 5 | 5 | 3 |
| Aminox | 0.5 | 0.5 | |
| Magnesium Oxide | | | 2.0 |
| Dicumyl Peroxide | 1.5 | 1.5 | 1.5 |
| Triethanolamine | | | 1 |

TABLE II.—EFFECT OF GLASS FINISH ON ADHESION FOR VARIOUS RUBBERS

| Glass Finish Chemical | Adhesion, lb. pull/in. | | |
|---|---|---|---|
|  | Natural Rubber | Nitrile Rubber | Chlorobutyl Rubber |
| None | 2.0 | 2.0 | 2.5 |
| A–172 Vinyl Silane [1] | 28.0 | 35.4 | 13.7 |
| Volan [2] | 3.8 | 3.3 | 5.9 |
| Divinyl Dichlorosilane | 10.1 | | 19.4 |
| Allyl Trichlorosilane | 3.6 | 3.4 | 10.4 |
| Ethyl Trichlorosilane | 2.1 | 2.1 | 7.7 |

[1] A–172 is a commercial form of vinyl silane being the vinyl silane ester of the monomethyl ether of ethylene glycol. It is marketed by Union Carbide Corp.
[2] A Werner type compound in which methacrylic acid is coordinated with chromium to form a highly reactive complex. It is marketed by the duPont Company.

*Example 3*

Peroxides other than dicumyl peroxide can be used for curing. For example, natural rubber was compounded as in Table I except that 1.5 parts of 2,5-bis(tertiarybutylperoxy)-2,5-dimethylhexane was used in place of dicumyl peroxide. Adhesion specimen with A–172 vinyl silane finished glass fabric was prepared and tested as in Example V. The resultant adhesion was 30 lb./in.

*Example 4*

Example 3 was repeated except that the peroxide used was di-tertiarybutyl peroxide. In this case the adhesion to A–172 vinyl silane finished glass fabric was 24 lb./in.

*Example 5*

In this example, rubber is adhered to a siliceous surface other than glass.

| | | |
|---|---|---|
| Paracril C | 100 | 100 |
| Ground Quartz | 50 | 50 |
| Zinc Oxide | 5 | 5 |
| Stearic Acid | 1 | 1 |
| Dicumyl Peroxide | 1.5 | 1.5 |
| A–172 | | 1 |
| Press cure 10 minutes at 307° F.: | | |
| Tensile, p.s.i. | 925 | 1,865 |
| Elongation, percent | 915 | 1,010 |
| 300% Modulus, p.s.i. | 240 | 390 |
| Hardness, Shore A | 54 | 54 |
| Tear, lb./in. | 85 | 182 |

This example illustrates that the reinforcing ability of ground quartz can be considerably improved by means of chemically binding the quartz to the rubber through the use of a vinyl silane.

*Example 6*

Vinyl tri-(B-methoxyethoxy) silane (A–172), vinyl trimethoxy silane, and gamma-methacryloxy propyl trimethoxy silane were each diluted with 1½ moles of water per mole of silane and allowed to stand for at least 24 hours. Each partially hydrolyzed ester was prepared as a solution in methyl ethyl ketone in 0.5 wt. percent concentration for the A–172 and the other two in molar equivalent concentrations. Samples of heat cleaned HG–28 glass fabric were treated with each of the three solutions, allowed to dry free of the solvent at room temperature, and then heated at 150° F. in an oven for ½ hour. Sandwich adhesion tests were then carried out using the following NBR compound:

| | Parts |
|---|---|
| Paracril C [a] | 100 |
| Pelletex [b] | 50 |
| Aminox [c] | 0.5 |
| Zinc oxide | 5 |
| Stearic Acid | 1 |
| Dibutyl phthalate | 15 |
| Dicup=40 HAF [d] | 3.75 |

Cure was effected for 20 minutes at 307° F. under 500 p.s.i.g.

[a] Butadiene-acrylonitrile ratio of about 65/35.
[b] A semi-reinforcing furnace black.
[c] Condensation product of an aldehyde and a secondary aromatic amine.
[d] Dicumene peroxide in 40% conc. deposited on HAF black.

Adhesions obtained between the NBR and HG–28 glass using the three silanes were as follows:

| Silane used: | Adhesion, lbs. pull/inch |
|---|---|
| A–172 | 7.5 |
| Vinyl trimethoxy | 4.0 |
| Gamma-methacryloxy propyl trimethoxy | 20.5 |

The methacryloxy alkyl type silane was much more effective than either of the two vinyl types.

*Example 7*

Fiber glass strands containing a commercial binder-lubricant sizing were heat cleaned at about 1000° F. for about 1 minute to remove the commercial sizing. The heat-cleaned glass strands were then dipped in a 1 wt. percent aqueous solution (containing 0.02 wt. percent morpholine) of vinyl tri-(beta-methoxyethoxy) silane (A–172 silane) and the silane-treated glass strands were then air dried overnight at room temperature. The dried silane-treated glass strands were then dipped in a methyl-ethyl ketone solution containing 20 wt. percent of the following NBR compound.

| | Parts |
|---|---|
| Paracril C | 100 |
| SRF black | 25 |
| Aminox | 0.5 |
| Zinc oxide | 5 |
| Stearic acid | 1 |
| Dicup-40 HAF | 1.88 |

The NBR coated glass strands were air dried overnight at room temperature, subsequently twisted and plied into a cord and then employed in the reinforcement of a hose prepard from Paracril C.

Paracril-C was compounded according to the recipe set forth below and employed in the preparation of the hose tube, hose layer and hose cover.

| | Parts |
|---|---|
| Paracril-C | 100 |
| SRF black | 100 |
| Aminox | 0.5 |
| Zinc oxide | 5 |
| Stearic acid | 1 |
| Dicup-40 HAF | 3.75 |
| Dibutyl phthalate | 30 |

A hose tube of 3 inches I.D. was prepared by extruding the compounded Paracril-C and forcing it onto a mandrel in the conventional manner. The dried Paracril-C coated glass cord was then wound on top of the hose tube with the warp running at an angle of 55°. The hose layer was then laid on top of the dried Paracril-C coated glass cord and a second ply of the dried Paracril-C coated glass cord was wound on the hose layer with the warp running at an angle of 55° in the opposite direction to that of the first ply. The hose cover was then laid on top of the second ply and the resultant hose was then wrapped with a conventional heat-shrinkable nylon pressure wrapping fabric. The wrapped hose was then conventionally cured at about 300° F. in an autoclave under 40 p.s.i.g. for 60 minutes. The hose was then removed from the autoclave, cooled overnight and the nylon wrapping was removed. A ten foot length of the hose was subjected to a conventional hydroburst test and it ruptured at an internal pressure of 900 p.s.i. (the theoretical burst strength of the hose is 1000 p.s.i.).

The aforementioned procedure was again repeated under identical conditions with the exception that the A–172 silane treated glass fabric was not subsequently coated with the NBR compound prior to its use in the reinforcement of the hose. In this instance the hose ruptured at an internal pressure of only 175 p.s.i., thus indicating the marked advantages of reinforcing a rubber with an elastomer coated silane treated reinforcing agent rather than with a silane treated reinforcing agent containing no elastomer top coating.

It is to be understood that this invention is not limited to the specific examples which have been offered merely as illustrations and that modifications may be made without departing from the spirit of the invention.

What is claimed is:

1. A process for preparing a reactive rubber-reinforcing article which comprises, in combination, the steps of:
    (a) treating the surface of a reinforcing agent with a liquid composition containing about 0.2 to 5 wt. percent of an organosilane compound so as to deposit on said surface about 0.1 to 3.0 wt. percent of said organosilane compound which is selected from the group consisting of an unsaturated silane, its siloxane and mixtures thereof, said unsaturated silane having the formula

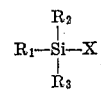

wherein $R_1$ is a radical containing vinyl-type unsaturation and is selected from the group consisting of alkenyl, styryl, alkenoylalkyl and alkenoyloxyalkyl, X is selected from the group consisting of halogen, hydroxyl, alkoxy and acyloxy, and $R_2$ and $R_3$ are independently selected from the group consisting of hydroxyl, methyl, halogen, alkoxy, acryloxy and $R_1$;

(b) applying to the organosilane-treated reinforcing agent a liquid composition containing a free radical curable elastomer and 0.2 to 10 parts, per 100 parts of elastomer, of a free radical curing agent so as to obtain a thin coating of said composition on said agent; and (c) drying the resultant product from step (b) sufficiently to substantially free it of any diluent or solvent but insufficiently to cause substantial cross-linking reactions between said elastomer and said silane so as to obtain a reinforcing agent whose surfaces have been substantially coated a thin film of about 10 to 60 wt. percent, based on the total weight of the elastomer-coated reinforcing agent, of said curing agent-containing free radical curable elastomer.

2. A process as in claim 1 wherein the reinforcing agent is fiber glass.

3. A process as in claim 1 wherein the silane is an alkenyl silane.

4. A process as in claim 1 wherein the silane is an alkenoyloxyalkyl silane.

5. A process as in claim 1 wherein the free radical curable elastomer is selected from the group consisting of natural rubber, synthetic polyisoprenes, copolymers of butadiene with acrylonitrile, copolymers of butadiene with styrene, chlorinated copolymers of isobutylene with isoprene, brominated copolymers of isobutylene with isoprene, polybutadienes, polychloroprenes and mixtures of two or more elastomers thereof.

6. A process as in claim 1 wherein the free radical curing agent is an organic peroxide.

7. A process as in claim 1 wherein the liquid composition containing said organosilane compound also contains 0.25 to 5 wt. percent, based on the weight of said total liquid composition, of said free radical curable elastomer.

8. A process for the preparation of a reactive rubber-reinforcing article which comprises, in combination, the steps of:
(a) treating the surface of glass fibers with a liquid composition containing about 0.2 to 5 wt. percent of vinyl tri-(beta-methoxyethoxy) silane so as to apply about 0.1 to 3.0 wt. percent of said silane to said surface;
(b) drying the silane-treated fibers until any diluent or solvent has been substantially removed therefrom;
(c) treating the dried silane-treated fibers with a liquid composition containing a copolymer of butadiene with acrylonitrile and 0.2 to 10 parts, per 100 parts of the copolymer, of dicumyl peroxide so as to apply a thin coating of said copolymer to said silane-treated fibers; and
(d) drying the resultant product from step (c) sufficiently to substantially remove any diluent or solvent therefrom but insufficiently to cause substantial cross-linking between said elastomer and said silane so as to obtain glass fibers whose surfaces have been substantially coated with a thin film of about 10 to 60 wt. percent, based on the total weight of the copolymer-coated glass fibers, of the dicumyl peroxide-containing butadiene-acrylonitrile copolymer.

9. A process as in claim 8 wherein the silane is gamma-trimethacryloxypropyl silane.

10. A reactive rubber-reinforcing article which comprises a reinforcing agent whose surfaces substantially contain:
(a) an initial coating of 0.1 to 3.0 wt. percent of an organosilane compound selected from the group consisting of an unsaturated silane, its siloxane and mixtures thereof, said unsaturated silane having the formula

wherein $R_1$ is a radical containing vinyl-type unsaturation and is selected from the group consisting of alkenyl, styryl, alkenoylalkyl and alkenoyloxy-alkyl, X is selected from the group consisting of halogen, hydroxyl, alkoxy and acyloxy, and $R_2$ and $R_3$ are independently selected from the group consisting of hydroxyl, methyl, halogen, alkoxy, acryloxy and $R_1$;
(b) a thin elastomer top coating comprising 10 to 60 wt. percent, based on the total weight of the elastomer-coated reinforcing agent, of a free radical curable elastomer containing 0.2 to 10 parts per 100 parts of elastomer, of a free radical curing agent, said elastomer coated-reinforcing agent having been dried until any diluent or solvent has been substantially removed therefrom but insufficiently to result in substantial cross-linking between said elastomer and said silane.

11. A rubber-reinforcing article as in claim 10 wherein the reinforcing agent is fiber glass.

12. A rubber-reinforcing article as in claim 10 wherein the silane is an alkenyl silane.

13. A rubber-reinforcing article as in claim 10 wherein the silane is an alkenoyloxyalkyl silane.

14. A rubber-reinforcing article as in claim 10 wherein the free radical curable elastomer is selected from the group consisting of natural rubber, synthetic polyisoprenes, copolymers of butadiene with acrylonitrile, copolymers of butadiene with styrene, chlorinated copolymers of isobutylene with isoprene, brominated copolymers of isobutylene with isoprene, polybutadienes, polychloroprenes and mixtures of two or more elastomers thereof.

15. A rubber-reinforcing article as in claim 10 wherein the free radical curing agent is an organic peroxide.

16. A rubber-reinforcing article as in claim 10 wherein the liquid composition containing the organosilane compound also contains 0.25 to 5 wt. percent, based on the weight of the total liquid composition, of a free radical curable elastomer.

17. A reactive rubber-reinforcing article which comprises glass fibers whose surfaces contain:
(a) an initial coating of vinyl tri-(beta-methoxy-ethoxy) silane, said silane-treated fibers having been dried until any diluent or solvent has been substantially removed therefrom;
(b) 10–60 wt. percent, based on the total weight of the copolymer coated glass fibers, of a copolymer elastomer of butadiene with acrylonitrile containing 0.2 to 10 parts, per 100 parts of the copolymer of dicumyl peroxide, said copolymer coated-glass fibers having been dried until any diluent or solvent has been substantially removed therefrom but insufficiently to cause substantial cross-linking between said elastomer and said silane.

18. A rubber-reinforcing article as in claim 17 wherein the silane is gamma-trimethacryloxypropyl silane.

19. A process for reinforcing rubbers which comprises:
(a) contacting the article of claim 10 with a rubber;
(b) simultaneously curing said rubber and said elastomer top coating wherein said rubber is cured with a conventional curing agent and said silane and said free radical curing agent precipitate in said curing reaction.

20. A process for reinforcing rubbers which comprises:
(a) contacting the article of claim 11 with a rubber selected from the group consisting of natural rubber, synthetic polyisoprenes, copolymers of butadiene with acrylonitrile, copolymers of butadiene with styrene, chlorinated copolymers of isobutylene with isoprene, brominated copolymers of isobutylene with isoprene, polybutadienes, polychloroprenes and mixtures of two or more rubbers thereof;
(b) simultaneously curing said rubber and said elastomer top coating wherein said rubber is cured with a conventional curing agent and said silane and said free radical curing agent precipitate in said curing reaction.

21. A reinforced rubber article containing at least one layer of a rubber reinforced by the process of claim 19.

22. A reinforced rubber article containing at least one layer of a rubber reinforced by the process of claim 20.

23. A reinforced rubber article according to claim 21 wherein said article is a rubber hose.

24. A reinforced rubber article according to claim 23 wherein said elastomeric coating is a copolymer of acrylonitrile and butadiene, and said rubber is a copolymer of acrylonitrile and butadiene, and said reinforcing agent is glass fiber.

References Cited by the Examiner
UNITED STATES PATENTS

| | | | |
|---|---|---|---|
| 2,742,378 | 4/1956 | Grotenhuis | 117—76 |
| 2,763,573 | 9/1956 | Biefeld | 117—126 |
| 2,952,576 | 9/1960 | Wheelock et al. | 154—46 |
| 2,965,515 | 12/1960 | Jellinek | 117—126 |
| 3,013,915 | 12/1961 | Morgan | 154—43 |
| 3,085,919 | 4/1963 | Clark | 154—43 |

ALFRED L. LEAVITT, *Primary Examiner.*

W. L. SOFFIAN, *Assistant Examiner.*

UNITED STATES PATENT OFFICE
CERTIFICATE OF CORRECTION

Patent No. 3,307,967

March 7, 1967

Byron M. Vanderbilt et al.

It is hereby certified that error appears in the above numbered patent requiring correction and that the said Letters Patent should read as corrected below.

Column 9, in the first table, line 7 thereof, for "=40" read -- -40 --; line 34, for "Dicumene" read -- Dicumyl --; line 72, for "prepard" read -- prepared --; column 11, line 57, for "trimethacryloxypropyl" read -- methacryloxy propyl trimethoxy --; column 12, line 53, after "gamma-" strike out "trimethacryloxypropyl" and insert instead -- methacryloxy propyl trimethoxy --; lines 60 and 74, for "precipitate", each occurrence, read -- participate --.

Signed and sealed this 28th day of November 1967.

(SEAL)
Attest:

EDWARD M. FLETCHER, JR.
Attesting Officer

EDWARD J. BRENNER
Commissioner of Patents